United States Patent
Delhoste et al.

(10) Patent No.: US 11,387,982 B2
(45) Date of Patent: Jul. 12, 2022

(54) METHOD FOR AUTHENTICATING A HASH OF A DATA PACKET FROM COLLECTED CONTEXT DATA BASED ON A HASH DISTANCE GENERATION STEP, FIRST AUTHENTICATION DEVICE, SECOND AUTHENTICATION DEVICE, AND AUTHENTICATION SYSTEM

(71) Applicant: THALES DIS FRANCE SAS, Meudon (FR)

(72) Inventors: Fabrice Delhoste, La Ciotat (FR); Frédéric Paillart, Gemenos (FR); Sébastien Petit, La Ciotat (FR)

(73) Assignee: THALES DIS FRANCE SAS, Meudon (FR)

( * ) Notice: Subject to any disclaimer, the term of this patent is extended or adjusted under 35 U.S.C. 154(b) by 0 days.

(21) Appl. No.: 16/958,252

(22) PCT Filed: Nov. 19, 2018

(86) PCT No.: PCT/EP2018/081759
§ 371 (c)(1),
(2) Date: Jun. 26, 2020

(87) PCT Pub. No.: WO2019/129422
PCT Pub. Date: Jul. 4, 2019

(65) Prior Publication Data
US 2020/0336300 A1    Oct. 22, 2020

(30) Foreign Application Priority Data
Dec. 29, 2017    (EP) .................................. 17306977

(51) Int. Cl.
*H04L 9/06*     (2006.01)
*H04L 9/08*     (2006.01)
*H04L 9/32*     (2006.01)

(52) U.S. Cl.
CPC .......... *H04L 9/0643* (2013.01); *H04L 9/0866* (2013.01); *H04L 9/3231* (2013.01); *H04L 9/3242* (2013.01)

(58) Field of Classification Search
CPC ... H04L 9/0643; H04L 9/0866; H04L 9/3231; H04L 9/3242
See application file for complete search history.

(56) References Cited

U.S. PATENT DOCUMENTS 9,514,753 B2 * 12/2016 Sharifi ..................... G10L 25/51
9,594,906 B1    3/2017 Langton et al.
(Continued)

FOREIGN PATENT DOCUMENTS

| EP | 2924603 A2 * | 9/2015 | ............. G06F 21/32 |
| EP | 2924603 A2 | 9/2015 | |
| WO | 2016083216 A1 | 6/2016 | |

OTHER PUBLICATIONS

International Search Report (PCT/ISA/210) and Written Opinion (PCT/ISA/237) dated Jan. 22, 2019, by the European Patent Office as the International Searching Authority for International Application No. PCT/EP2018/081759.
(Continued)

*Primary Examiner* — Jeffrey C Pwu
*Assistant Examiner* — Mayasa A. Shaawat
(74) *Attorney, Agent, or Firm* — Marc Boillot; Thales DIS CPL USA, Inc

(57) ABSTRACT

The invention relates to an authentication method. The method comprises: collecting, based on a predetermined authentication policy, at least one context data element; constituting, based on the at least one collected context data element, a data packet; generating, by using a predetermined hash type algorithm and the data packet, as input to the predetermined hash type algorithm, a hash; sending the generated hash; generating, as a hash distance generation
(Continued)

step, a hash distance between the generated hash and a predetermined reference hash; and authenticating successfully or not based on the generated hash distance, as an authentication step. The invention also relates to corresponding device and system.

10 Claims, 2 Drawing Sheets

(56) References Cited

U.S. PATENT DOCUMENTS

| | | | | |
|---|---|---|---|---|
| 2004/0221153 | A1* | 11/2004 | Kim | H04L 9/0637 713/150 |
| 2006/0020796 | A1* | 1/2006 | Aura | H04L 63/123 713/168 |
| 2008/0181403 | A1* | 7/2008 | Sakamoto | H04L 9/3236 380/258 |
| 2014/0108800 | A1* | 4/2014 | Lawrence | H04L 9/3297 713/168 |
| 2015/0096023 | A1 | 4/2015 | Mesdaq et al. | |
| 2016/0323243 | A1 | 11/2016 | Levasseur et al. | |
| 2017/0109514 | A1* | 4/2017 | Cheng | G06F 21/316 |

OTHER PUBLICATIONS

Office Action (Communication pursuant to Article 94(3) EPC) dated Jul. 6, 2021, by the European Patent Office in corresponding European Patent Application No. 18800679.5. (2 pages).

* cited by examiner

METHOD FOR AUTHENTICATING A HASH OF A DATA PACKET FROM COLLECTED CONTEXT DATA BASED ON A HASH DISTANCE GENERATION STEP, FIRST AUTHENTICATION DEVICE, SECOND AUTHENTICATION DEVICE, AND AUTHENTICATION SYSTEM

FIELD OF THE INVENTION

The present invention relates generally to an authentication method and an authentication device.

Furthermore, the invention pertains to an authentication system as well. The system includes at least two devices.

The present invention is notably applicable to a field in which a first device is e.g. a mobile (tele)phone or a Personal Computer (or PC) and a second device is e.g. a (local) Secure Element (or SE) or a remote server.

Within the present description, an SE is a smart object that includes a chip(s) that protect(s), as a tamper resistant component(s), access to stored data and that is intended to communicate data with a device(s), like e.g., an SE host device, and/or an SE user.

STATE OF THE ART

EP 2 924 603 A2 describes a user authentication technique based on a transmission, from a client to a server, of a captured video signal including a physical user characteristic(s) and a physical object(s)/element(s) in the user environment. The sever analyses the captured video signal to determine a value associated with each of the visual and audio elements, as environment characteristics. The server determines a total score for the captured video signal and compares the total score to a predetermined reference score. The server decides to authorize (or not) based on a comparison result.

However, such a known solution requires a big bandwidth, namely several Mb, for an upload of the captured video signal. Moreover, the uploaded captured video signal includes information that discloses the user environment and therefore private data.

There is a need of an alternative authentication solution while being more efficient and more secure than such an aforementioned known solution.

SUMMARY OF THE INVENTION

The invention proposes a solution for satisfying the just herein above specified need by providing an authentication method.

According to the invention, the method comprises:
collecting, based on a predetermined authentication policy, at least one context data element;
constituting, based on the at least one collected context data element, a data packet;
generating, by using a predetermined hash type algorithm and the data packet, as input to the predetermined hash type algorithm, a hash;
sending the generated hash;
generating, as a hash distance generation step, a hash distance between the generated hash and a predetermined reference hash; and
authenticating successfully or not based on the generated hash distance, as an authentication step.

The principle of the invention consists in capturing, at a client device side, (local) context (or environment) data element(s) depending on an authentication policy, building a corresponding data packet and determining with a predefined hash type algorithm and, as input, the data packet a corresponding hash. The client device sends the determined hash. Then, a hash distance between the determined hash and a predefined reference hash is determined. The thus determined hash distance is then used for authenticating (or not) the tested authentication context (under survey).

The authentication policy defines notably the number and/or the nature of the context data element(s) to be captured. The authentication policy may include data relating to the used (client) device, a user, object(s) or thing(s) to be locally present and detected. To capture the context data element(s), the invention does not impose any constraint. The client device may use a camera(s), a microphone(s) and/or one or several sensors that is(are) incorporated within or connected to the client device.

The invention (authentication) solution is, through the authentication policy, configurable and therefore adaptable to different (local) environment or context scenario(s).

Since the client device (or a cooperating device, such as an SE), where there is an environment to be authenticated, generates (or determines) a hash from a data packet resulting from captured environment or context data element(s), the hash is transmitted in a secure and protected manner.

A software component, such as a library, a hardware component and/or a device may carry out the hash distance generation step and the authentication step. The software component may be supported by the client device, a local device, such as an SE, cooperating with the client device, or a remote device, such as a remote server. The hardware component may be incorporated within or connected or coupled to the client device, a local device, such as an SE, cooperating with the client device, or a remote device, such as a remote server.

It is noteworthy that the hash distance generation step provides a hash distance that allows to determine whether the generated hash is more or less close to a predefined reference hash. The hash distance allows inferring whether the corresponding captured context data element(s) is(are) or is(are) not successfully authenticated, i.e. sufficiently close to respective predetermined reference captured context data element(s).

The hash distance may be generated through a hash type comparison algorithm.

An authentication of the concerned (local) environment or context under survey is therefore carried out through such a hash distance that is specific to (or characterizes) the invention solution.

The hash distance allows the invention solution to be resilient to more or less small changes with respect to the predefined reference hash while still authenticating successfully the concerned (local) environment or context, i.e. the value of at least some captured (or collected) context data element(s) has changed slightly.

It is to be noted that the hash or digest, as a byte stream relating to original captured context data element(s), is a string of bits with a resulting length, from e.g. 32 bytes to e.g. a few kbytes. The resulting length may be (or not) variable according to the captured context data element(s).

The hash relates to the original (captured) context data element(s) and reduces the number of bits (or elements of information) to be transferred with respect to the original context data element(s).

Contrary to the aforementioned prior art solution, the invention solution does not need a large bandwidth to transmit data, including the hash, relating to the concerned environment or context, since the data relating to the concerned context includes only a few data (up to a few kbytes) to be transmitted.

Contrary to the aforementioned prior art solution, the invention solution is therefore efficient.

Moreover, the hash obfuscates the concerned original context data element(s), i.e. does not disclose any original context data element(s) in plain text.

Since no data relating to the privacy is transmitted in plain text, the invention is thus compliant with data privacy and therefore the Generation Data Protection Regulation (or GDPR).

Contrary to the aforementioned prior art solution, due to the use of a hash (and not the use of the concerned captured context data element(s) in plain text), the invention solution is secure.

The invention solution is an environment or context authentication solution that allows authenticating the concerned (local) environment or context under survey.

The invention solution is user convenient.

Advantageously, the predetermined hash type algorithm comprising a Locality Sensitive Hash (or LSH) type algorithm, the method further comprises, as the hash distance generation step and the authentication step, the following steps:

generating, by using the locality sensitive hash type algorithm, a score, as a level of similarity between the generated hash and the predetermined reference hash;

comparing the score to a predetermined threshold value;

authenticating successfully only if the score is equal to or greater than the predetermined threshold value.

The LSH type algorithm, as a hash type algorithm, is advantageously used to generate a score, as a hash distance used for comparing the generated hash to the predefined reference hash.

The generated score is then checked with respect to a predefined threshold value, so as to authenticate (or not) the concerned context.

Thus, the invention solution may be, through the score, as the hash distance, more or less permissive with respect to the predefined reference hash that has to be approached by the generated hash from the collected context data element(s).

It is to be noted that the score is either the hash distance itself or the result of a computation derived from the (hash) distance depending on the used algorithm for comparing the generated hash.

According to an additional aspect, the invention is a first authentication device.

According to the invention, the first authentication device is configured to:

collect, based on a predetermined authentication policy, at least one context data element;

constitute, based on the at least one collected context data element, a data packet;

generate, by using a predetermined hash type algorithm and the data packet, as input to the predetermined hash type algorithm, a hash; and send to a second device the generated hash.

The first authentication device may be a mobile phone, a PC or any computing device.

According to an additional aspect, the invention is a second authentication device.

According to the invention, the second authentication device is configured to:

receive a generated hash;

generate a hash distance between the generated hash and a predetermined reference hash; and authenticate successfully or not based on the generated hash distance.

The second authentication device may be a secure element, a remote server or any computing device.

According to still a further aspect, the invention is an authentication system.

According to the invention, the system comprising a first authentication device and at least one second authentication device, the first authentication device is configured to:

collect, based on a predetermined authentication policy, at least one context data element;

constitute, based on the at least one collected context data element, a data packet;

generate, by using a predetermined hash type algorithm and the data packet, as input to the predetermined hash type algorithm, a hash;

send to the second authentication device, the generated hash; and the second authentication device is configured to:

receive from the first device, the generated hash;

generate a hash distance between the generated hash and a predetermined reference hash; and authenticate successfully or not based on the generated hash distance.

BRIEF DESCRIPTION OF THE DRAWINGS

Additional features and advantages of the invention will be apparent from a detailed description of one preferred embodiment of the invention, given as an indicative and non-limitative example, in conjunction with the following drawings.

DETAILED DESCRIPTION

Herein under is considered an exemplary embodiment in which the invention authentication method is implemented notably by a phone, as a client (computer) device and a standalone entity, i.e. without cooperating with another device, such as an SE, and a remote server.

According to another exemplary embodiment (not represented), the invention authentication method is implemented by a computer device, as a terminal, in cooperation with an SE embedded within or connected to the terminal. According to such an embodiment, the SE, as a local and second authentication device, is adapted to perform the functions that are carried out by the server and described herein below while enhancing the security of stored and/or processed data.

The SE may be an incorporated chip, as a chip soldered, possibly in a removable manner, like e.g., an embedded SE, an embedded Universal Integrated Circuit Card (or eUICC) or an integrated Universal Integrated Circuit Card (or iUICC), on a Printed Circuit Board (or PCB) of the terminal, or a chip that is coupled to the terminal and included within a Universal Serial Bus (or USB), a smart card or any other medium (that may have different form factors), as an SE host device. The chip may thus be fixed to or removable from its host device, like e.g., the mobile phone.

The invention does not impose any constraint as to a kind of the SE type.

Naturally, the herein below described embodiment is only for exemplifying purposes and is not considered to reduce the scope of the present invention.

Figure 1:
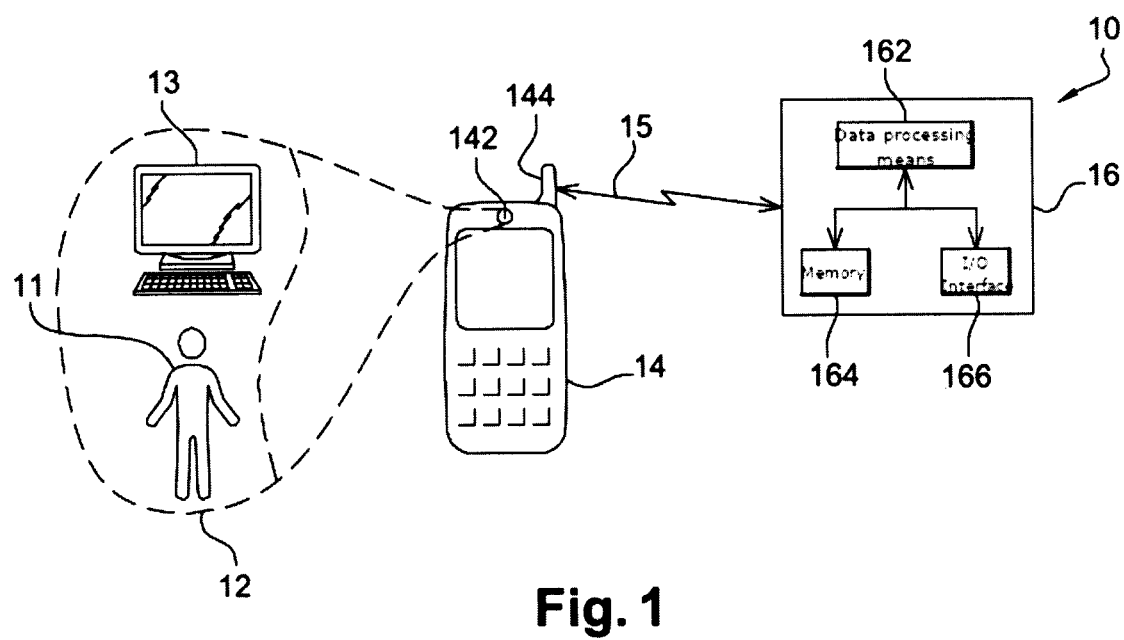
FIG. 1 illustrates a simplified diagram of an exemplary embodiment of a system comprising a mobile phone and a server, the phone being configured to collect, based on a predefined authentication policy, a data element(s) comprised within the phone context, constitute a corresponding data packet, generate a corresponding hash, and send to the server the hash, the server being configured to generate a hash distance between the hash and a predetermined reference hash and authenticate, based on to the hash distance, the concerned context, according to the invention.

FIG. 1 shows schematically an (authentication) system 10 that includes a (mobile) phone 14 and a remote (web) server 16.

The system is arranged to authenticate (or not) a context 12 (or environment) under survey.

The context 12 includes e.g. a user 11, as the owner of the phone 14.

Additionally (or alternately), the context 12 includes e.g. a TeleVision (or TV) set 13, as a physical object or thing.

However, the invention (authentication) solution is also applicable when the context 12 includes one or several human beings (and/or animal(s)) and/or one or several (physical) things.

For the sake of simplicity, only one phone 14, as a first (authentication) device, and only one user 11 and one object, as context data elements, have been represented.

However, the server 16, as a second (authentication) device, manages a set of context accounts and respective reference (context) hashes that have been previously respectively registered while using the same invention authentication process.

Instead of being constituted by a phone, the first device may be constituted by e.g., a smart phone, a PC, a vehicle, a virtual reality device, an augmented reality device, an Internet Of Things type device, a set-top box, a tablet computer, a desktop computer, a laptop computer, a video player, an audio player, a media-player, a game console, a netbook, a Personal Digital Assistant (or PDA), and/or any other computer device. Such a list of first devices is given as mere examples for a first device that may be used without being exhaustive.

Instead of being constituted by a physical first device, a software component, such as a library, or a hardware component carries out the functions that are described infra and that are performed by the phone 14.

The phone 14 includes one or several Central Processing Unit(s) (or CPU), (micro)processor(s) and/or (micro)controller(s) (not represented), as data processing means, one or several memories (not represented), as data storing means, and one or several Input/Output (or I/O) interfaces (not represented).

The (or each) phone processor processes data originating from and/or intended to any internal component and data originating from and/or intended to any external device through one or several phone I/O interfaces.

The phone memories may include one or several EEPROMs (acronym for "Electrically Erasable Programmable Read-Only Memory"), one or several ROMs (acronym for "Read Only Memory"), one or several Flash memories and/or any other memories of different types, like e.g., one or several RAMs (acronym for "Random Access Memory").

The phone 14 supports one or several Operating Systems (or OS).

The phone 14 supports a client application that allows the phone 14 to send, after a context data element collection, a corresponding data packet constitution and a corresponding hash generation, to the server 16 information including the generated hash. The generated hash allows the server 16 to authenticate (or not) the concerned context 12.

A phone 14 memory (and/or a memory of another device connected or coupled to the phone 14) stores a Mobile Station International Subscriber Directory Number (or MSISDN), as the phone 14 number, and/or the like, as a phone 14 Identifiers (or ID), an International Mobile Equipment Identity (or IMEI), an email address and/or other data that allow(s) uniquely identifying the phone 14, as the first device.

The phone I/O interface(s) may comprise (and/or be connected to) a display screen and a keyboard, as a phone Man Machine Interface (or MMI), so as to interact with the user 11.

The phone I/O interface(s) includes e.g., a camera 142, so as to capture or collect video or picture data that is included in the environment or context that is present in front of the camera 142.

The phone I/O interface(s) includes e.g., one or several sensors that allow each to collect data relating to the context of the phone 14.

The phone I/O interface(s) includes e.g., an antenna 144, allowing to transmit data, through a Radio-Frequency (or RF) link(s) 15, as a wireless link(s), via a possible (communication) network(s), to the server 16.

The RF may be fixed at several hundreds of MHz, e.g., around 850, 900, 1800, 1900 and/or 2100 MHz, as Long Range (or LR) type RF.

The RF link 15 between the phone 14 and the server 16 is at least mono-directional, namely at least an uplink, i.e. from the phone 14 to the server 16.

The channel may be related to an HyperText Transfer Protocol (or HTTP) (Secure) (registered trademark) type channel, an Over-The-Air (or OTA), an Over-The-Internet (or OTI) type channel or any other data communication channel.

The channel using the RF link 15 may be secure or unsecure.

The phone 14 is arranged to collect, based on a predetermined authentication policy, an image (or picture) (and/or a video signal) including image data relating to the user 11 face and image data relating to the TV 13, as data elements included in the context (relating to the phone 14).

To collect a context data element(s), the phone 14 may use a Machine Learning (or ML) engine to analyse a collected (or captured) image.

Each context data element is preferably a string of bits (or units of information) with an individual fixed length.

The authentication policy allows configuring the phone 14 to process data originating from a surrounding environment of the phone 14, so as to authenticate the concerned environment.

The authentication policy is preferably previously (prior to launching an authentication process) provided by the server 16 or another server (not represented) connected to the server 16. The authentication policy comprises a set of identified context data elements to be collected, so as to define context data element(s) to be collected.

As context data element(s), the context data element(s) may include, besides image data relating to the user face and image data relating to the TV 13, other data, such as a phone ID, a Service Set IDentifier (or SSID), an OS version ID, geolocation data (like e.g., Global Positioning System (or GPS) data), a user 11 heart rate (not represented) and/or other data. To collect a context data element(s), the phone 14 may get or retrieve data, such as a phone ID, stored in a memory included within the phone 14 or a device connected or coupled to the phone 14.

The authentication policy may also define how the concerned context data element(s) is transformed into a corresponding data packet, how the resulting data packet is possibly processed, such as grouped, ciphered, weighted and/or sorted, and/or how a corresponding hash has to be generated.

The authentication policy may comprise information allowing to group together at least certain collected context data elements with respect to the other collected context data element(s). Thus, certain context data elements are to be grouped within one and the same group, such as data relating to the operation of the phone 14, like e.g., an SSID and/or an OS version ID, and/or data relating to the audio and/or visual environment.

When two or more collected context data elements are grouped, the concerned collected context data element group impacts the corresponding generated hash distance (or score) by increasing the hash distance (or score) variation, i.e. if at least one of the collected context data elements within a concerned group changes, then the resulting corresponding generated hash distance (or score) varies more than if all of the collected context data elements of the group were kept (individually) separated from each other.

The authentication policy may comprise data for requesting that a data packet that results from the context data element(s) (possibly grouped at least in part) has to be ciphered by using a key generated from submitted user authentication data (or one or several data items originating from one or several external sources, such as a thermometer) (instead of being ciphered, being processed by a keyed one way function (i.e. non reversible), such as HMAC type function). Such a data packet ciphering request may further specify to use a specific encryption key, a specific encryption key generation algorithm, a specific data encryption algorithm and/or a process to generate the concerned encryption key or algorithm. The encryption key may be generated by using user authentication data, such as a Personal Identity Number (or PIN), a One-Time Password (or OTP), a password and/or a biometric user feature(s), such as a one or several user fingerprints, a user iris, a user face and/or a user palm(s), and/or data provided by one or several external sources, such as an SE, as input to an (identified) key generation algorithm. The encryption key may be generated by using a Hash-based Message Authentication Code (or HMAC) key derivation function.

The authentication policy may comprise data for identifying a user authentication to be used for authenticating the user 11, when applicable, i.e. when the user authentication data is to be included in the context data element(s). For example, the user 11 has to authenticate by providing a PIN, an OTP, a password and/or a biometric user feature(s), such as a one or several user fingerprints, a user iris, a user face and/or a user palm(s).

The authentication policy may comprise one or several weights to be associated with a specific (identified) group(s) and/or a specific (identified) context data element(s), so as to give heavier importance to the concerned group(s) and/or context data element(s) with respect to the other collected group(s) and/or collected context data element(s) within a corresponding data packet.

The authentication policy may comprise data for requesting that, prior to generating a corresponding hash, the context data element(s) (possibly grouped at least in part) has to be sorted, according to a predetermined numerical order, such as an increasing or decreasing numerical order.

The authentication policy may comprise data for identifying a hash type algorithm to be used for generating a hash relating to the collected context data element(s).

The authentication policy may comprise data for identifying several hash type algorithms to be used for generating several hashes relating to the collected context data elements which may have separate natures of data elements. The corresponding hash distance (or score) to be generated is then averaged (or weighted) the hashes resulting from each hash type algorithms.

Optionally, the phone 14 is arranged, preferably according to the authentication policy, to group at least two collected context data elements within the collected context data elements within the data packet.

The phone 14 is adapted to constitute, based on the collected context data element(s), a (resulting) data packet by e.g. concatenating the collected context data element(s).

The data packet is a kind of passphrase comprising, as word(s), the collected context data element(s).

The data packet is a string of bits (or units of information) with a resulting length that may vary depending on the collected context data element length(s) between separate context authentication sessions. The data packet length corresponds to an addition of all of the individual length(s) relating to the collected context data element(s).

Optionally, the phone 14 is adapted, preferably according to the authentication policy, to cipher or encrypt the data packet. Each of the context data elements that are possibly grouped at least in part is thus ciphered by using a predetermined encryption key. The encryption key may have been generated by using a HMAC type derivation function.

Optionally, the phone is adapted to weigh, according to the authentication policy, one or several (identified) collected context data element(s) of the collected context data element(s) that may have been previously grouped within the data packet. Such a collected context data element weighing may depend on a predetermined hash type algorithm to be used for generating a hash. Such a collected context data element weighing allows favouring the concerned collected context data element(s) and/or the concerned context data group(s) with respect to the other context data elements comprised within the concerned data packet. To weigh the concerned context data element(s), the phone 14 may duplicate the concerned context data element(s).

Optionally, the phone is arranged preferably according to the authentication policy, to sort, according to a numerical order, such as an increasing or a decreasing numerical order, the collected context data element(s) within the data packet. Such a (collected) context data element sorting allows preserving, depending on the used hash type algorithm, a generation of a corresponding hash and therefore a corresponding hash distance, i.e. the hash to be generated does not change when the concerned context data element sorting order is kept.

According to an essential invention feature, the phone 14 is configured to generate a hash by using a predetermined hash type algorithm and the data packet, as input to the predetermined hash type algorithm.

The predetermined hash type algorithm may be one of the following algorithms: a Locality Sensitive Hash (or LSH) type algorithm, a fuzzy matching type algorithm, a Trend micro Locality Sensitive Hash (or TLSH) type algorithm, a nilsimsa type algorithm, an sdhash type algorithm, an ssdeep type algorithm, an approximate matching type algorithm, a near duplicate matching type algorithm and a similarity detection type algorithm.

Such a list of hash type algorithms is given without being exhaustive as mere examples for an hash type algorithm that may be used for generating a hash with, as input, a data packet.

The hash type algorithm may incorporate a weighting, within the collected context data element(s), of one or several context data elements and/or one or several context data element group(s).

The phone 14 is arranged to send to the server 16, as a second (authentication) device, the generated hash.

Such a generated hash, as a cipher and a kind of context signature, allows not to disclose any original (user) private data that has been locally collected and therefore preserve the data privacy.

The generated hash has a fixed length that is a few data (up to a few kbits).

Instead of being constituted by a (physical) server, the second device may be constituted by e.g., a smart phone, a PC, a vehicle, a virtual reality device, an augmented reality device, an Internet Of Things type device, a set-top box, a tablet computer, a desktop computer, a laptop computer, a video player, an audio player, a media-player, a game console, a netbook, a Personal Digital Assistant (or PDA), and/or any other computer device. Such a list of second devices is given as mere examples for a second device that may be used without being exhaustive.

Instead of being constituted by a physical second device, a software component, such as a library, or a hardware component carries out the functions that are described infra and that are performed by the server 16.

The server 16 is connected to the phone 14 over the link 15.

The server 16 is remote and accessible through possibly one, two or more communication networks, such as an Intranet network and/or an Internet network, that allow to define or form a corresponding communication channel.

The corresponding communication channel may be secure or unsecure.

According to an alternative embodiment (not represented), the server 16 is local. For example, the server 16 is embedded within a device, such as an SE that is connected or coupled to the PC 14.

The server 16 may be operated or managed by a Mobile Network Operator (or MNO), a Mobile Virtual Network Operator (or MVNO), a banking Operator, a wire communication network operator, a service Operator (or administrator) or on behalf of a service Operator, as a service provider.

The server 16 includes one or several CPU(s), (micro) processor(s) and/or (micro)controller(s) 162, as data processing means, one or several memories 164, as data storing means, and one or several I/O interfaces 166 that are internally together connected.

A (or the) server I/O interface 166 is used for communicating with external devices, such as the first device 14.

A (or the) server memory 164 stores preferably, besides an OS, an invention (server) authentication application accessible from the server 16 processor.

A (or the) server memory 164 stores or registers a database.

The database includes a set of e.g. first device accounts. The database relates to a set of e.g. first devices, as a fleet of first devices.

Each first device account may include one or several associated user identifiers, such as a user name.

The database includes preferably, in association with e.g. each (identified) first device account, a corresponding predetermined reference hash.

The predetermined reference hash has been previously (i.e. during an enrolment or registration phase and prior to any (context) authentication) registered while using the invention authentication process.

The database may associate, for each individual first device or the first device set, a registered predetermined hash type algorithm.

The predetermined hash type algorithm may be one of the following algorithms an LSH type algorithm, a fuzzy matching type algorithm, a TLSH type algorithm, a nilsimsa type algorithm, an sdhash type algorithm, an ssdeep type algorithm, an approximate matching type algorithm, a near duplicate matching type algorithm and a similarity detection type algorithm.

Such a list of hash type algorithms is given without being exhaustive as mere examples for an hash type algorithm that may be used for generating a hash distance with, as inputs, a generated hash (to be received from a client device) and a corresponding (registered) reference hash.

The database may associate, for each individual first device or the first device set, a registered predetermined threshold value.

The predetermined threshold value has been previously (i.e. prior to any (context) authentication) registered. The predetermined threshold value is configurable according to a level of risk that the concerned service provider may take.

The (or each) server processor processes data originating from and/or intended to any internal component and data originating from and/or intended to any external device through one or several server I/O interfaces.

The server 16 supports one or several OSs.

The server 16 supports a server application that allows the server 16, after a hash reception and a corresponding hash distance generation, to authenticate (or not), based on the hash distance, the concerned phone context.

The server 16 may be configured to generate and send an authentication policy to the first device, such as the phone 14, prior to any first device enrolment.

The server 16 is adapted to receive, from an (identified) client device, such as the phone 14, a generated hash.

The server 16 identifies, based on a received e.g. client device ID(s), a corresponding first device registered within the database accessible to the server 16.

Then, the server 16 retrieves a predetermined reference hash that is registered in association with the registered first device or a corresponding first device fleet.

According to an essential invention feature, the server 16 is configured to generate on-the-fly, i.e. when a first device launches a login (or connection) session with the server 16, a score, as a hash distance between the (received) generated hash and a (registered) predetermined reference hash.

To generate the score, the server 16 uses the (retrieved) predetermined hash type algorithm and the (retrieved) predetermined reference hash.

The server 16 is adapted to authenticate successfully or not, based on the generated hash distance, the concerned context 12.

More exactly, the server 16 is configured to fail to authenticate the context 12 if the generated hash distance is less than the (retrieved) predetermined threshold value.

The server 16 is configured to succeed in authenticating the context 12 if the generated hash distance is equal to or greater than the (retrieved) predetermined threshold value.

The server 16 may be adapted to store, preferably in a secure and persistent manner, the (received) generated hash, each time the authentication is successful. Such a generated hash storage when the authentication is successful allows to trace the success authentication history or evolvement.

Alternately (or additionally), each time the authentication is successful, the server 16 is arranged to register, instead of the predetermined reference hash, the (received) generated hash, as an updated reference hash to be used for a next authentication. The authentication process taking into account the last generated hash, as the updated reference hash for a new (context) authentication, lets evolve the corresponding reference hash with the time at each authentication success.

Figure 2:
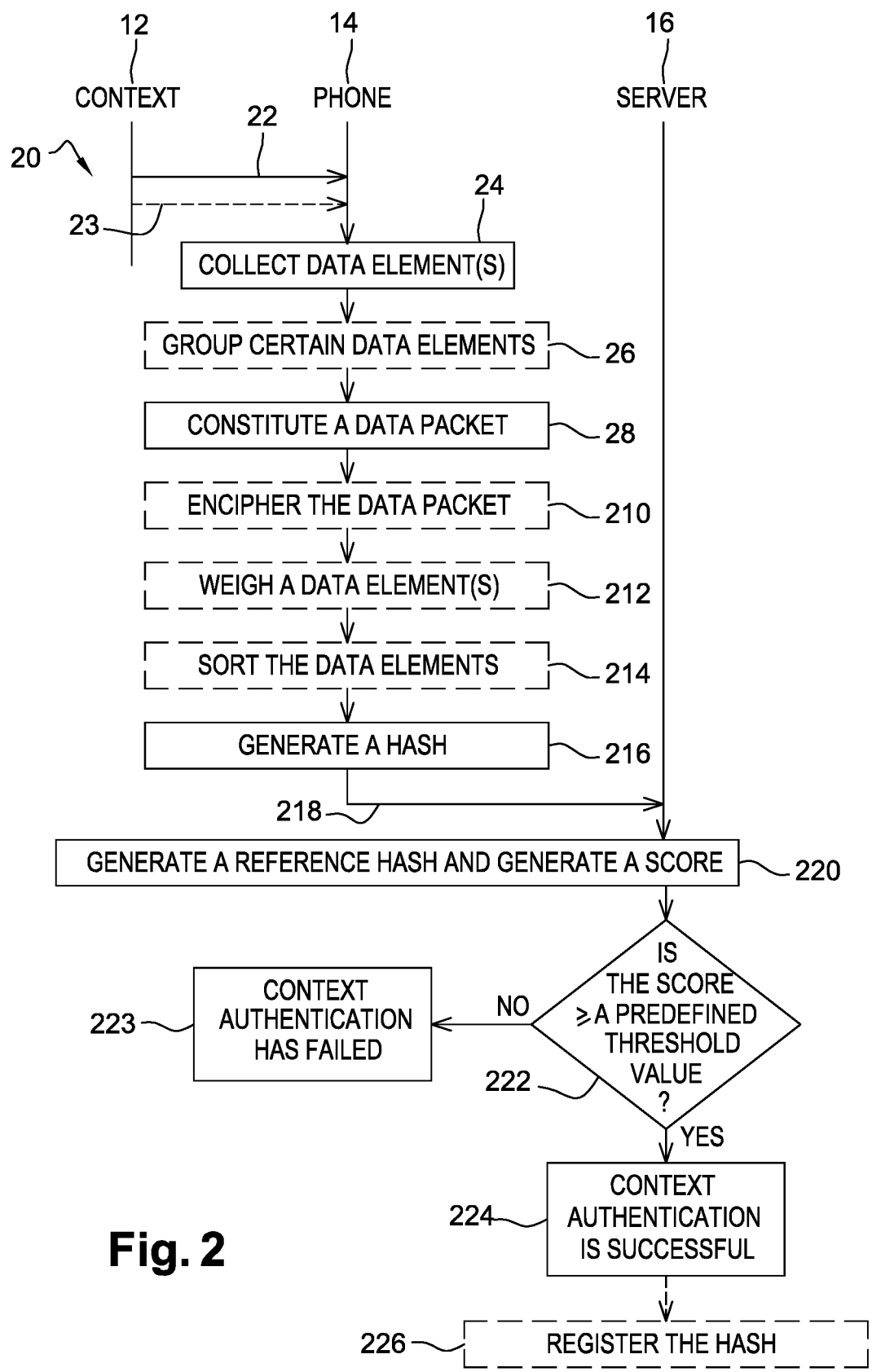
FIG. 2 represents an example of a flow of messages exchanged between the user, the phone and the server of the system of FIG. 1, so that the server receives a hash generated at the client side, generates a corresponding hash distance and authenticates (or not), thanks to the generated hash distance, the concerned context.

FIG. 2 depicts an example of a message flow 20 that involves the phone 14 and the server 16, so that the server 16 authenticates the context 12 based on a hash distance between a (received) generated hash and a (registered) predetermined reference hash.

It is assumed that the authentication policy has been provided during a personalization phase to the phone 14. The authentication policy requests to collect an image relating to the user 11 face, an image relating to the TV 13 and a phone ID, as three context data elements to be detected, so as to authenticate the user 11.

It is further assumed that the server 16 has previously registered (not represented) a user 11 ID in association with the phone 14 number, as a phone ID, a predetermined reference hash corresponding to the user 11 face image, the TV 13 image and the phone ID, as corresponding context data elements, a predetermined threshold value, such as e.g. 75%, and a predetermined hash type algorithm to be used for generating a hash distance.

It is assumed that the predetermined hash type algorithm to be used for generating a hash and a corresponding hash distance is e.g. a LSH type algorithm.

The use of an LSH type algorithm allows generating similar hashes, i.e. a hash distance or score that is good, i.e. the score is equal or greater than the predefined threshold value, when there is a slight change between the hash relating to the current context under survey and the reference hash relating to a corresponding reference context.

The phone 14 thus constitutes a reference first (communication) device to be locally present within the user 11 context 12, so as to authenticate, through the context 12, the user 11.

It is further assumed that the phone 14 accesses the phone 14 ID and an image signal captured by the phone camera 142.

An execution of the client application supported by the phone 14 is automatically launched (i.e. without any involvement of the user 11).

Alternately, the user 11 launches the client application while using an MMI that is included in or connected to the phone 14.

The phone 14 gets, through the phone camera 142, an image signal 22 relating to all the physical human(s) (and/or animal(s)) and/or thing(s) that are present in front of the phone 14.

In the present scenario, the image signal includes e.g. the user 11 face image and the TV 13 image.

The phone 14 retrieves (not represented) from a phone memory the MSISDN of the phone 14, as the phone 14 ID.

Instead of collecting the phone 14 ID from a phone memory, the phone 14 collects from a locally connected device, such as an SE that has preferably authenticate a user e.g. through a PIN comparison to a reference PIN that is stored in an SE memory, the phone 14 ID 23.

The phone 14 collects 24 the user 11 face image and the TV 13 image while extracting from the image signal 22 the user 11 face image and the TV 13 image and the phone 14 ID, as three context data elements required by the authentication policy.

The phone 14 may group 26, based on the authentication policy, at least two context data elements, e.g., the user 11 face image and the TV 13 image, as one and the same context data element group, within the collected data elements.

The phone 14 constitutes 28, based on the collected context data elements, a data packet by e.g. concatenating the collected context data elements Optionally, the phone 14 enciphers 210, based on the authentication policy, the (resulting) data packet, so as to improve the security aspect. The data packet that is thus enciphered while using a key depending on e.g. user authentication impacts on the corresponding hash distance (or score). If the user is not successfully authenticated (at the client side), then the corresponding resulting hash is remote from a predetermined reference hash leading to a "bad" hash distance (or score) and therefore a failure of context authentication (even if the other collected context data element(s) is(are) right with respect to a collected reference context data element(s) that produces the corresponding predetermined reference hash).

The phone 14 may weigh 212, based on the authentication policy (or the used predetermined hash type algorithm), more or less heavy, one or several collected context data elements and/or one or several groups of collected context data elements with respect to the other collected context data elements within the data packet.

Optionally, the phone 14 sorts 214, according to a numerical order, such as a decreasing or an increasing order, the collected context data elements that are possibly grouped at least in part, possibly enciphered and/or possibly weighted, within the data packet.

Then, the phone 14 generates 216, by using e.g. a nilsimsa algorithm and the data packet, as input to the nilsimsa algorithm, a hash.

The phone 14 sends, through e.g., a Short Message Service (or SMS), Multimedia Messaging Service (or MMS), Transmission Control Protocol/Internet Protocol (or TCP/IP), or HTTP(s) type channel, to an (identified) server 16 a message 218 that includes the phone ID and the generated hash.

Once the server 16 has received the message, the server 16 identifies (not represented), based on the phone ID, the concerned user 11 account and thus the associated predetermined reference hash and the associated predetermined hash type algorithm to be used for generating a hash distance.

Then, the server 16 generates a hash distance between the (received) generated hash and the predetermined reference hash.

To generate the hash distance, the server 16 gets the reference hash and generates 220 a score by using e.g. the nilsimsa algorithm and the received generated hash and the predetermined reference hash, as the two inputs to the nilsimsa algorithm. The score is considered as a level of similarity between the received generated hash and the predetermined reference hash. For instance with the nilsimsa algorithm, the score is "0" (zero) when there is no similarity i.e.0% of similarity, is "96" when there is 75% of similarity and is "128" when there is a full similarity, i.e. 100% of similarity.

Once the server 16 has generated the hash distance, the server 16 verifies 222 whether the authentication is or is not successful based on the generated hash distance. To do such an authentication verification, the server 16 compares 222 the generated score with respect to the predetermined threshold value.

If the generated score is less than the predetermined threshold value, then the server 16 fails 223 to authenticate, through the user context 12, the user 11 and denies user access to the service(s) managed by or through the server 16.

Otherwise, i.e. if the generated score is equal to or greater than the predetermined threshold value, then the server 16 succeeds 224 in authenticating, through the user context 12, the user 11 and grants user access to a service(s) managed by or through the server 16.

Optionally, if the generated score is equal to or greater than the predetermined threshold value, the server 16 registers 226 the received generated hash by either further enriching (or adding to) a database relating to the reference hashes in case of authentication success or substituting the received generated hash to the registered predetermined reference hash. Thus, in this latter case, the authentication process is continuously adaptive along the way the authentication context is evolving.

Optionally, the server 16 sends (not represented) to the phone 14, through the same channel or an out-of-band channel than the one used for the submission of the generated hash, a message that includes a request to present or display the authentication result. Then, the phone 14 presents or displays the authentication result (not represented), such as "authentication failure" or "authentication success".

For the user, the invention solution is simple, easy, quick and practical since the user does not need to be involved. As a matter of fact, the user has just to present her or his face and the TV in front of the camera. The user does not need to enter any data, like e.g., an OTP, a number or a text on the first device, so as to let a first part collect the required context data elements and issue a corresponding hash to be verified by a second part, as its addressee, in order to be authenticated.

The invention solution allows carrying out a secure and efficient context authentication based on a hash distance that allows keeping flexibility.

The invention solution allows adapting to more or less small authentication context data element change(s), according to a level of risk to be adopted.

The invention solution does not include any oracle on the client (device) since it has no means for validating or verifying the generated hash. As a matter of fact, only the server is able to verify the generated hash.

The invention solution prevents thus from a client side brute-force attack of user authentication.

The embodiment that has just been described is not intended to limit the scope of the concerned invention. Other embodiments may be given. As another embodiment, instead of using an LR RF technology channel to transmit information to the second device, the first device uses a Short Range (or SR) RF technology(ies), like e.g., a Wi-Fi, Bluetooth, a Near Field Communication or a Bluetooth Low Energy type technology(ies).

The invention claimed is:

1. An authentication method comprising:
   collecting, based on a predetermined authentication policy, at least one context data element;
   constituting a data packet, based on the at least one collected context data element;
   generating a hash, by using a predetermined hash type algorithm and the data packet, as input to the predetermined hash type algorithm
   sending the generated hash;
   generating, as a hash distance generation step, a hash distance between the generated hash and a predetermined reference hash; and
   authenticating successfully or not based on the generated hash distance, as an authentication; wherein said at least one context data element is a captured image represented as a string of bits with a fixed length for constituting said data packet, and wherein said hash is a byte stream generated from said string of bits representing said captured image for said data packet.

2. The method according to claim 1, wherein, the predetermined hash type algorithm comprises a locality sensitive hash type algorithm, and wherein the method further comprises, as the hash distance generation step and the authentication step, the following steps:
   generating a score, by using the locality sensitive hash type algorithm, as a level of similarity between the generated hash and the predetermined reference hash;
   comparing the score to a predetermined threshold value;
   authenticating successfully only if the score is equal to or greater than the predetermined threshold value.

3. The method according to claim 1, wherein, prior to generating the hash, the method further comprises sorting, according to a numerical order, the at least one collected context data element within the data packet.

4. The method according to claim 1, wherein, prior to generating the hash, the method further comprises weighting, according to the authentication policy, the at least one context data element.

5. The method according to claim 1, wherein, prior to constituting the data packet, the method further comprises grouping together, according to the authentication policy, at least two context data elements comprised within the at least one context data element, to constitute at least one corresponding context data group.

6. The method according to claim 1, wherein, prior to generating the hash, the method further comprises ciphering the data packet, according to the authentication policy.

7. The method according to claim 6, wherein a key used for the data packet ciphering includes a key generated by using a hash-based message authentication code key type derivation function.

8. A first authentication device, wherein the first authentication device is configured to:
   collect at least one context data element, based on a predetermined authentication policy;
   constitute a data packet, based on the at least one collected context data element;
   generate a hash, by using a predetermined hash type algorithm and the data packet, as input to the predetermined hash type algorithm; and
   send the generated hash to a second authentication device; wherein said at least one context data element is a captured image represented as a string of bits with a fixed length for constituting said data packet, and wherein said hash is a byte stream generated from said string of bits representing said captured image for said data packet.

9. A second authentication device, wherein the second authentication device is configured to:
- receive a generated hash;
- generate a hash distance between the generated hash and a predetermined reference hash; and
- authenticate successfully or not based on the generated hash distance.

10. An authentication system, comprising a first authentication device and at least one second authentication device, wherein the first authentication device is configured to:
- collect at least one context data element, based on a predetermined authentication policy;
- constitute a data packet, based on the at least one collected context data element;
- generate a hash, by using a predetermined hash type algorithm and the data packet, as input to the predetermined hash type algorithm; and
- send to the second authentication device, the generated hash;

and wherein the second authentication device is configured to:
- receive the generated hash from the first device;
- generate a hash distance between the generated hash and a predetermined reference hash; and
- authenticate successfully or not based on the generated hash distance; wherein said at least one context data element is a captured image represented as a string of bits with a fixed length for constituting said data packet, and wherein said hash is a byte stream generated from said string of bits representing said captured image for said data packet.

* * * * *